Patented Dec. 27, 1938

2,141,455

UNITED STATES PATENT OFFICE 2,141,455

PROCESS OF DEGRADING PROTEIN PRODUCTS

Charles Weizmann, London, England

No Drawing. Application July 18, 1935, Serial No. 32,123. In Great Britain July 21, 1934

13 Claims. (Cl. 99—17)

This invention relates to yeast preparations and to processes involving plasmolysis and autolysis of yeast with the object of preparing enzyme mixtures, more especially mixtures rich in proteolytic enzymes and protein degradation products, with the ultimate object of obtaining from yeast in an economical manner valuable substances rich in enzymes and/or vitamins, suitable for nutritive and/or medicinal uses. It also relates to hydrolysis of proteins, for the production, in a convenient and economical manner, and in some cases from materials at present only available for low grade uses such as for cattle food, of components or mixtures consisting of or containing degraded proteins, or protein degradation products, and preferably rich in vitamins, especially products which are edible, highly nutritious, and suitable for human food purposes, and preferably also possess an agreeable taste.

Plasmolysis is a liquefaction process believed to comprise a shrinkage of the plasma of the yeast cell and passage of water from the interior to the exterior of the cell, sooner or later involving rupture and destruction of the life of the cell in some cases by osmotic pressure effects produced by soluble substances which need not necessarily be specific yeast poisons but which in some cases may advantageously be relatively rapidly acting poisons: toluene, chloroform and other substances are of the poison class. The liquefaction takes place with a velocity which varies according to the substances used, the condition of the yeast and the temperature and other conditions under which the process is conducted. Autolysis may be said to be the process which follows in continuation of plasmolysis in favorable conditions and broadly comprises attack upon the cell protein by such small quantity of proteolytic enzymes, i. e. protease, as originally occurred in the yeast (the enzymes of the latter having by the plasmolysis been brought in part from an insoluble and inactive state into an active state, while by far the greater part, particularly the maltase and protease, having remained inactive and more or less fixed in the cellulose and/or the protein of the cell). The attack of the protease on the protein, i. e. proteolysis, initiates dissolution of the protein by hydrolysis and as the latter proceeds enzymes formerly and inactively fixed in the protein are known to be liberated, and this by a process which research has shown to be enzymotic and therefore subject broadly to the same conditions and influences as govern enzymatic processes.

A further object is to provide for the highly efficient treatment of protein materials whereby practically the whole of the proteins may be hydrolyzed, and to enable high yields to be obtained as when the starting material is of a kind relatively very rich in protein.

The invention has also for a broad object, to exploit to the utmost, in connection with the hydrolysis of proteins, the very remarkable proteolytic or proteoclastic activity found to be possessed by certain enzymatic solutions or mixtures of yeast origin, obtainable by carefully controlled plasmolytic and autolytic processes under favorable conditions.

Having regard to the objects of the present invention there are found to be two principal conditions affecting the production of enzymic solutions from yeast, viz. (a) that of effecting the plasmolysis in such a way as may initiate the autolysis in the most favorable conditions, i. e. with a sufficiency of active protease for commencement of the degration of the protein, and (b) that of conducting the autolysis in such a way as to enable control of the enzymatic processes to be obtained, and also both to accelerate and to ensure a high yield of solubilized protein by such processes.

Observance of these conditions has been found considerably to restrict the choice of agents employed and also to render essential great care in the processes, without which the objects of the invention cannot be achieved and the products which result are of little or no value, being of low enzymatic and/or vitamin activity, and/or poor in protein degradation products.

The process of the present invention broadly provides for the preparation from yeast of a product rich in degraded proteins together with a mixture of active proteolytic enzymes by systematic plasmolysis and autolysis of yeast under conditions producing successive liberation of various enzyme groups and securing from stage to stage a large and preferably about a maximum yield both of such enzymes and of protein degradation products the enzymes in the product constituting a natural range, i. e. a range corresponding closely to the range of proteolytic enzymes natural to the starting material.

The invention further consists in the preparation of a product comprising degraded proteins and a mixture of active proteolytic enzymes by plasmolysis of yeast in conditions favorable for initiating enzymatic processes followed by autolysis so conducted that proteolytic enzymes, which are severally and respectively capable of degrading or further degrading protein and its degradation products, occur or are set free in succession as the solution contains, or the progress of the proteolysis furnishes, products reactable with said enzymes.

In these processes, the conditions and agents employed are such as are found favorable for enzymatic processes, particularly employing proteolytic enzymes capable of degrading protein substances of lower molecular weights, followed by autolysis in conditions of acidity and temperature regulated to permit free or unhindered enzymatic action up to a complete or predetermined partial degradation of protein substances towards amino-acids.

The invention consists in a process for the preparation from a yeast of a product comprising a high yield of degraded proteins together with a natural range of active proteolytic enzymes in which plasmolysis is effected with the aid of an organic cell poison innocuous to or not destructive of the liberated proteolytic enzymes and is followed by autolysis conducted at temperatures of the order of 36° C. while the pH value is controlled within the approximate range 6.3 to 6.6, aseptic conditions being maintained throughout the process.

The invention further consists in a process according to any of the foregoing statments utilizing as a plasmolyzing agent a substance, e. g. ethyl acetate, innocuous to proteolytic enzymes, preferably of pronounced lipoid- and water-solubilities whereby to secure relatively rapid action.

The invention further consists in a process according to any of the preceding paragraphs comprising a period of autolysis effected at temperatures of the order of 35-36° C., or sufficiently high to promote proteolysis at a suitable speed but not so high as to destroy delicate enzymic and/or vitamin components taking part in or resulting from the autolysis and/or required in the autolyzed product.

The invention further consists in a process according to any of the preceding paragraphs employing careful control of acidity during the autolytic process to about an optimum for enzymatic action, preferably pH=6.5.

The invention further consists in a process according to the last preceding paragraph utilizing for acidity control regulated additions of alkali, preferably of a buffering compound, and preferably trisodium phosphate.

The invention also consists in the proteolysis of other protein substances, especially vegetable proteins, by the product of or simultaneously with the yeast proteolysis according to any of the preceding paragraphs.

The invention also consists in the hydrolysis of protein-containing substances in the presence of enzymes released during proteolysis of yeast.

The invention also consists in the hydrolysis of proteins in the presence of the product of the systematic plasmolysis and autolysis of yeast productive of stagewise liberation of enzyme groups and degradation of yeast protein.

The invention also consists in a process combining proteolysis of yeast and of other protein-containing substances such as vegetal bodies, e. g. cereals and the like.

The invention also consists in effecting hydrolysis of vegetal bodies and others containing proteins under the influence of degraded proteins in mixture with active proteolytic enzymes produced by regulated and controlled proteolysis of yeast.

The invention also consists in subjecting to a period of incubation in aseptic conditions a mixture of protein substance, e. g. vegetal protein, with more or less degraded protein containing active proteolytic enzymes liberated from yeast.

The invention also consists in the manufacture of protein degradation products utilizing protein substances other than yeast, and hydrolyzing the same by the proteolytic action of an active mixture produced by the process set forth in any of the first eight of the preceding statements.

The invention also consists in the specific application of processes as indicated in any of the preceding paragraphs to the treatment of substances having a notably high protein content, e. g. to the practically complete hydrolysis and solution of liquefaction of the protein of soy beans and the like.

The invention also consists in the improved products derived from proteins by hydrolysis effected in the presence of and/or promoted by the action of proteolytic enzymes of yeast origin substantially as hereinafter indicated.

The invention also consists in the production of protein-degradation products by the action of active yeast proteolysis products upon cereal substances or residues such as distillers' and brewers' grains and the like, substantially as hereinafter indicated.

The invention also consists in the solubilizing or mild decomposition of natural proteins before or after utilization of carbohydrates associated therewith for industrial processes, the solubilizing and the like being effected and the products worked up, substantially in accordance with any of the preceding paragraphs or the following description.

The invention further consists in the processes of protein treatment or hydrolysis and products resulting from such processes, substantially in accordance with any of the specific examples herein.

In carrying the invention into effect in a general way the yeast to be treated is preferably fresh moist pressed yeast and its plasmolysis is effected by addition of a relatively small quantity, say, 5 to 10 per cent. of a cell poison. For the most generally satisfactory action I have found the most suitable substances to be such as have substantial lipoid- and water-solubilities, and for the purpose of the present invention ethyl acetate has been found of special utility on account of its rapid action and the fact that it is innocuous to the proteolytic enzymes in the yeast; which enzymes or protease are of principal importance herein and are proteinase (breaking down high molecular weight proteins to peptones and polypeptides), polypeptidase (breaking down polypeptides to dipeptides), and lastly dipeptidase (breaking down dipeptides to amino-acids), all capable of acting hydrolytically to constitute the process called proteolysis. Experiment has shown the last enzyme, dipeptidase, to be particularly delicate, and in a measure this accounts for the selection herein of ethyl acetate as plasmolyzer and also for the exclusion of chloroform and carbon tetrachloride which in such capacity are found or believed to destroy the said enzyme. Toluene has not the specific defect indicated, but its action is too slow for the best results, at least when used alone.

Using 5 per cent. ethyl acetate as above, at normal or room temperature, plasmolysis is completed in 5 to 10 minutes, and, while the resulting liquid is in suitable condition for autolytic processes, it is from this point that particular care is necessary. If the liquid is merely allowed to stand unattended at a temperature permitting enzymic action it becomes more and more acid due to the formation of acids by the disorganized and uncontrolled action of enzymes in the poisoned cell. The acidity reaches about pH 5 to 4.5 after about half an hour or an hour, depending on the freshness of the yeast. $CO_2$ previously present in the form of carbonate being driven out at such acidities and the phenomenon of "sparking" takes place.

As distinct from such method, however, I do not permit the plasmolyzed yeast medium to become so acid, as such acidity is sufficient to prevent or seriously inhibit passage of enzymes into solution. On the contrary I add a 5 per cent solution of tribasic sodium phosphate $$(Na_3PO_4.12H_2O);$$

not at once the amount expected to be sufficient to neutralize the acid formed say in the following 24 hours, but gradually in such amounts as will keep the pH within the optimal range, viz. 6.3 to 6.6. Control of acidity as above may be effected in a variety of ways, but I have found electrometric titration methods of special utility.

According to one illustrative specific example:—400 g. yeast were plasmolyzed with 20 cc. ethyl acetate, after liquefaction diluted with 400 cc. water, stirred and the initial pH measured was found to be (544 millivolt) pH=4.9. 60.9 cc. of 5 per cent. sodium phosphate were immediately added to obtain (610 mv.) pH 6.34. Further additions of phosphate were so regulated that the potentiometer showed always 610 mv., i. e. pH=6.34. On one occasion, overnight, the acidity increased somewhat, viz. to pH=5.8. The proteolysis was allowed to continue overnight and the acidity was again adjusted next morning. A total of 162.6 cc. of phosphate were added over a period of 24 hours. From plasmolysis onwards the temperature was kept at or close to 36° C.

It will be understood that control of acidity, as above, may be obtained by use of an alkali, e. g. sodium carbonate, by giving continuous attention to the proteolysis and by making frequent and regular additions of calculated small amounts of the alkali to combat the tendency for the acidity to increase. This, however, is troublesome and the use of a buffering compound as, for instance, trisodium phosphate, as indicated in the example enables quite substantial additions to be made at considerable intervals without either reducing the acidity to such an extent as to injure the alkali-sensitive dipeptidase, or yet permitting within quite long unattended periods of time increase of the acidity to pH values outside the optimal pH limits.

It will be seen then that the principal requirement for proper and practical acidity control is the use of a buffering compound. Of such there are a number, but I have found the most suitable to be alkaline phosphates; and a sodium salt is chosen in view of the fact that edible substances are my ultimate aim.

The importance of my processes as illustrated above can be best appreciated by contrasting the same with a known process in which acidities of the order of pH=5 obtain in the autolysis:—

A portion of fresh bakers' yeast was divided in two parts, the first being plasmolyzed and kept neutral according to my method described above; the second being mixed with one-third of its weight of water and 4 per cent. of a mixture of equal parts of toluene and chloroform, and both being kept in an incubator for a period of 48 hours. Both products were then filtered and separately adjusted to the same pH=6.37. The calculated number of cc. corresponding to 5 g. yeast was added in each case to 30 cc. of 4 per cent. gelatin and made up with water to 50 cc. After 24 hours 1 cc. was taken out of each and the amino acids formed were determined by titration in alcohol solution with 0.4 n. alcohol KOH, using thymolphthalein as indicator. The results of these comparative experiments showed the respective yields to be as 4:1.

Returning now to the ultimate aims of the present invention, a rapid process of autolysis can be provided for such that the nitrogenous contents of the yeast cells become solubilized and practically all of the nitrogenous products are obtainable in aqueous solution. The solution thus obtained is rich in vitamins and enzymes, especially proteolytic, and yields, if concentrated by careful evaporation in vacuo, a brownish more or less dry product having a pleasant taste, which can be used as a nutrient or for medicinal purposes either alone or in admixture with other foodstuffs, and either directly or after suitable preparation.

If desired, this product may be heated at about 70° C. for about two hours, or otherwise treated with the effect of improving its flavor; and heating up to about 100° C. may be an advantage from some points of view.

The efficiency of the process in respect of the solubilizing of the yeast protein, as well as the rapidity of the process, can be judged from the following example:—

400 g. of bakers' yeast were liquefied by mixing with 40 cc. of ethyl acetate 40 cc. of toluene were then added together with 1600 cc. of water, such quantity of toluene being sufficient to form a protective antiseptic film over the magma, the mixture thereupon incubated at 36° C. After 22½ hours' incubation with acidity control on the lines already indicated, a sample was filtered and the specific gravity of the filtrate determined approximately by hydrometer. A nitrogen estimation was also made of the filtrate in order to determine the amount of soluble nitrogenous substances. Similar observations were made at the end of 42½ hours and 89 hours. The table below gives the results obtained.

| Time of incubation | Specific gravity of filtrate | Soluble nitrogenous substances calculated as protein in the whole mixture |
|---|---|---|
| Hours | | Grams |
| 22½ | 1.014 | 43.7 |
| 42½ | 1.0145 | 48.1 |
| 89 | 1.015 | 49.0 |

Now, the total amount of nitrogenous substances, calculated as protein, in 400 grams of the particular sample of yeast used was found to be 51 grams; the results given above therefore indicate that practically the whole of the protein is rendered soluble in 89 hours, and a very considerable proportion in the first 24 hours.

It will be noted, in the last example, that toluene was added. Its function here is essentially that of a powerful antiseptic, inhibiting bacterial fermentation so as to ensure unrestricted enzymatic action. Where an antiseptic addition is essential for obtaining aseptic conditions, toluene can of course be replaced by other substances, subject however to the exclusion of chloroform and others injurious to any one or more of the proteolytic enzymes of the yeast. Preferably the antiseptic is such as is not too volatile and on the other hand is capable of forming an effective sterilizing layer upon the reaction mixture; it should, if injurious in foodstuffs, be capable of expulsion, say in the evaporation for concentration of the autolyzate, or otherwise in a simple way.

The autolyzate may alternatively and preferably be employed, not as a foodstuff or otherwise directly as by concentration and the like, but for the treatment of other proteins, especially vegetal proteins and it is in such usage that the possession by the yeast autolyzate or the production by the process of autolysis of a natural range of proteoclastic enzymes displays a particular advantage. Its high enzymic activity when prepared according to the foregoing directions renders it specially suitable for such a purpose and its use to such an end enables satisfactory control to be had of the proteolysis of such other proteins and leads to high overall yields of products of notable enzymatic and vitamin activity.

The yeast proteolysis and that of other protein substances may in some cases be effected simultaneously, i. e. with the yeast and the other substance in mixture from the start of plasmolysis onwards, although on the contrary it may in some cases be advisable to complete the yeast autolysis with its own proteolytic processes so as to secure better control of the action of the yeast enzymes and restrict such action to the orderly degradation of the protein of the other substance.

In carrying the invention into effect, in a general way as applied to other proteins; the substance containing protein to be hydrolyzed for rendering the protein water soluble and obtaining products of the character already mentioned, is if desired first treated as with a suitable solvent medium for extraction of oil. After treatment with water, e. g. a period of soaking at a temperature of about 36° C., or a scalding and cooling, it is mixed with a quantity of the product of yeast autolysis effected under conditions such as those treated in detail in an earlier part of this specification. In aseptic conditions, ensured if required by the addition of antiseptic substance, the mixture is incubated also at about 36° C. and a relatively quick solubilizing of the protein takes place, with a very high total yield.

Incubation at a higher temperature is in some cases permissible and advantageous in the sense, for instance, of accelerating the process; a temperature of 47° may be used.

The following examples illustrate several specific ways of carrying out the invention, some utilizing a starting material of a particularly high protein content, viz. soy beans:—

EXAMPLE I

*Preparation of soy meal*

100 grams of crude soy meal were extracted with acetone to remove the oil; the weight of the dry residue was 75 grams containing 52.5 per cent. of protein.

*Preparation of autolyzed yeast*

150 grams of fresh bakers' yeast was plasmolyzed with 5 per cent. by weight of ethyl acetate and then autolyzed for twenty-four hours at room temperature; during the autolysis 150 cc. of a 7 per cent. sodium phosphate ($Na_2HPO_4 2H_2O$) solution was added to maintain the reaction at the desired pH.

*Hydrolysis of the soy proteins*

10 grams of the soy meal prepared as above were first soaked in water at 36° for several hours; then mixed with an amount of the above autolyzed yeast, corresponding to 25 grams of the original yeast. After the addition of a little toluene the mixture having a total volume of 400 cc. was incubated at 36°. The protein contained in the soy meal was 5.25 grams; that in the yeast 3.33 grams. After three days it was found that 86.3 per cent. of the soy protein had been rendered water soluble; after six days 98 per cent. had been rendered water soluble and 30 per cent. of the total nitrogen of the soy protein was present in the form of amino nitrogen, which is a measure of the extent of the enzymotic hydrolysis of the proteins, and an indication also of the completeness of the range of proteolytic enzymes.

On evaporation in vacuo a pasty product was obtained having an agreeable meaty taste.

EXAMPLE II

An amount of autolyzed yeast, as used in Example I, corresponding to 25 grams of yeast was mixed with 20 grams of soy meal and incubated at 36° C. as before, under the same conditions as in Example I. After six days it was found that the whole of the soy protein had been rendered water soluble and that 35.7 per cent. of the total nitrogen was in the form of amino nitrogen.

EXAMPLE III 200 grams of crude soy meal were extracted in a Soxhlet apparatus first with 96 per cent. alcohol and then with petroleum ether. 30 grams of the meal thus prepared were soaked in water at 35° C. for several hours and the suspension of the meal then mixed with an amount of autolyzed yeast corresponding to 25 grams of yeast as in Example I. After the addition of a little toluene the mixture, having a volume of 400 cc., was incubated at 37° C. After three days' incubation 73 per cent. of the soy protein had been rendered water soluble. After thirteen days the whole of the protein had been rendered soluble and 43 per cent. of the total nitrogen was in the form of amino nitrogen. The product on evaporation gave a paste having an agreeable flavor.

EXAMPLE IV 500 grams of soy meal, which had been previously extracted with acetone, was soaked in 2.5 liters of water at 36° C. for twenty hours.

945 grams of brewers' yeast (top yeast) which had been thoroughly washed and pressed was plasmolyzed with 5 per cent. of ethyl acetate and then autolyzed for twenty-four hours at room temperature. During autolysis 450 cc. of a 5 per cent. sodium phosphate ($Na_3PO_4 12H_2O$) solution was added to maintain the reaction at the desired pH.

1 liter of this autolyzed yeast mixture containing nitrogen corresponding to 74.1 grams of yeast protein was mixed with the suspension of soy meal described above, a little toluene added and the mixture incubated at 37° C. After seven days 99.7 per cent. of the soy protein had been rendered water soluble and 44.5 per cent. of the nitrogen was in the form of amino nitrogen.

The filtered product was concentrated by evaporation to about 2 liters, separated from about 5 grams of tyrosine, which crystallized out, and then further evaporated to dryness when a dry powder having an agreeable taste was obtained.

EXAMPLE V 50 grams of soy meal, as used in Example IV and containing 26.7 grams of protein, was mixed with 200 cc. of boiling water; after cooling to 40° C. a quantity of autolyzed yeast, prepared as in Example IV and corresponding to a content of 8 grams of yeast protein was added; the mixture was diluted to 400 cc. with water and incubated at 47° C. in presence of toluene for 48 hours. At the end of this time it was found that 75 per cent. of the soy protein was in solution.

The following examples illustrate how the proteins contained in distillers' grains and brewers' grains may be utilized according to the present invention:—

EXAMPLE VI

*Utilization of distillers' grains*

125 grams of maize meal were cooked for 2 hours at 30 lbs. pressure with 2 liters of water, cooled to 60° C. and malted with 12.5 grams of barley malt. The residual grains were separated from the wort, washed with water and then mixed with a quantity of autolyzed yeast, corresponding to 4.4 grams of yeast protein, prepared according to the method given in Example IV. The mixture was incubated at 36° C. in the presence of toluene for 8 days. At the end of this time analysis showed that 65 per cent. of the total protein contained in the grains had been rendered soluble, and 67 per cent. of the total soluble nitrogen was in the form of amino nitrogen. The product was filtered and evaporated as in previous examples.

EXAMPLE VII

*Utilization of brewers' grains*

A quantity of autolyzed yeast prepared as in Example IV and corresponding to a content of 73 grams of yeast protein was mixed with 3.5 kg. of fresh moist brewers' malt grains having a protein content of 110 grams. The mixture was diluted to 12 liters with water, incubated at 36° C. in the presence of toluene for 7 days and then filtered. Analysis of the filtrate showed that 69 per cent. of the proteins contained in the grains had been rendered water soluble, and on evaporation the filtrate gave a product of agreeable taste.

In general, as plasmolyzing agent I prefer to use alkyl esters or for example ethyl acetate, as above, having a relatively high plasmolytic activity. It is of importance also, especially if a buffering compound is not used for acidity control, to effect mixing in of the alkali rapidly so as to avoid local over-concentration. I may additionally introduce before or during proteolysis an auxiliary enzyme or enzymes, with the effect of further accelerating the process, e. g. papain, or amylase from any suitable source. I contemplate such addition more especially when proteolyzing other substances besides the yeast and more especially to compensate for any reduction or shortage of enzymotic activity as may occur from various causes such as imperfection of the yeast proteolysis and/or low or not particularly suitable enzymatic content of the vegetal or other protein substance.

Protein separated from natural substances containing vegetable proteins, and is especially applicable to the various types of cereals used for industrial production of useful carbohydrate derivatives therefrom, e. g. starches, sugars, alcohols, acetone and other bodies, including cattle cake, can in some instances be utilized in complete or partial substitution for any of the protein starting materials hereinbefore mentioned or of the same character. Thus, bodies containing vegetable proteins, e. g. seed grains, and particularly cereals, even after the separation of the bran and germ by milling processes, can be treated (as by the aid of preferably inexpensive and non-toxic aqueous protein solvents, preferably such as an aqueous solution of ethyl alcohol or a weak solution of caustic soda) for the extraction of substantial quantities of protein matters therefrom without inhibiting their practical fermentable qualities or their suitability for working up in other ways: such protein extractives are capable of use in accordance with the hydrolytic or proteolytic processes of the present invention.

I claim:

1. The process which comprises mixing yeast with up to about 10% of its weight of a plasmolyzing agent, innocuous to proteolytic enzymes, to effect plasmolysis in a period of the order of 10 minutes, incubating the plasmolyzate, to permit autolysis to take place, at a temperature of about 36° C. for a period of 20–30 hours, adding alkaline substances to the magma throughout the time of said incubation in quantities and at intervals regulated to maintain the pH within the approximate range of 6.3 to 6.6.

2. A process according to claim 1, consisting in mixing ethyl acetate with yeast, adding toluol as an antiseptic, and water, incubating the magma foe a period of approximately 20 hours while adding tri-sodium phosphate at a rate sufficient to maintain the said pH conditions.

3. A process according to claim 1, which consists in mixing with yeast a rapidly acting plasmolyzing agent, incubating the mixture under the said conditions of temperature and pH, and concentrating the incubated product by careful evaporation.

4. The process which comprises mixing yeast with up to about 10% of its weight of ethyl acetate, to effect plasmolysis in a period of the order of 10 minutes, incubating the plasmolyzate for a longer period whilst making additions of sodium phosphate to the magma throughout the time of said incubation in quantities and at intervals regulated to maintain the pH within the approximate range of 6.3–6.6 to produce yeast autolyzate, then mixing the said yeast autolyzate with vegetable material having a high content of degradable protein, and incubating the mixture at a temperature of approximately 36° C. whilst again maintaining the pH within the approximate range of 6.3 to 6.6 by regulated alkaline additions.

5. The process which comprises mixing yeast with up to about 10% of its weight of ethyl acetate to effect plasmolysis in a period of the order of ten minutes, incubating the plasmolyzate for a period of the order of 24 hours, and making additions of tri-sodium phosphate to the magma throughout the time of said incubation in quantities and at intervals regulated to maintain the pH within the approximate range of 6.3–6.6, then mixing the yeast autolyzate with soy meal, incubating the mixture until proteolysis has proceeded to a satisfactory degree.

6. Claim 4 as modified in that proteolytic enzymes from an external source are added to augment enzymic action in said mixture.

7. Claim 5 as modified in that proteolytic enzymes from an external source are added to augment enzymic action in said mixture.

8. A process according to claim 4, comprising evaporation of the autolyzed yeast product.

9. A process according to claim 5, comprising evaporation of the autolyzed mixed product.

10. A process comprising preparing an aqueous medium from soy bean metal, preparing a yeast autolyzate according to claim 1, mixing said medium and said autolyzate, adding toluol and subjecting the mixture to incubation at a temperature of about 37° C., until proteolysis has proceeded to a satisfactory degree.

11. A process comprising preparing a yeast autolyzate according to claim 4, mixing it with distiller's grains, adding toluol and subjecting the mixture to incubation at a temperature of about 36° C. until proteolysis has proceeded to a satisfactory degree.

12. A process comprising preparing a yeast autolyzate according to claim 4, mixing it with malt grains, adding toluol and subjecting the mixture to incubation at a temperature of about 36° C. until proteolysis has proceeded to a satisfactory degree.

13. A process according to claim 5, comprising the addition of proteolytic enzymes from an external source to augment enzymic action in said mixture.

CHARLES WEIZMANN.